United States Patent Office

3,462,376
Patented Aug. 19, 1969

---

3,462,376
CATALYST AND PREPARATION THEREOF
James C. Kirk, Ponca City, Okla., assignor, by mesne assignments, to Columbian Carbon Company, a corporation of Delaware
No Drawing. Application June 14, 1962, Ser. No. 202,385, now Patent No. 3,247,270, dated Apr. 19, 1966, which is a continuation-in-part of application Ser. No. 32,528, May 31, 1960. Divided and this application June 14, 1965, Ser. No. 477,995
Int. Cl. B01j *11/06*
U.S. Cl. 252—428
12 Claims

ABSTRACT OF THE DISCLOSURE

A catalyst, useful for producing cycloolefinic compounds such as cyclooctadiene from conjugated diolefinic compounds such as butadiene is provided by interacting nickel carbonyl with a compound, such as a trialkyl aluminum, of the formula $[(R)_a M(X)_b]_c$, wherein M is a nontransition metal from periodic groups I–A, II–A, II–B, III–A, and IV–A, R is a hydrocarbon or hydrogen radical, X is a halide radical, and $a$ and $b$ are numbers the sum of which is equal to the valence of the metal, with the proviso that $a$ and $c$ are always 1 or more. Where $a$ is more than one and $b$ equals zero, R may include hydrocarbon and hydrogen radicals, as in the organometallic hydrides. When R is exclusively hydrogen, $b$ equals zero. The formula includes metal hydrides, organometallics, and organometallic halides and hydrides all of which is more particularly described in the specification which follows.

---

This application is a division of copending application Ser. No. 202,385 filed June 14, 1962, now Patent No. 3,247,270 which is a continuation-in-part of application Ser. No. 32,528, filed May 31, 1960, and now abandoned.

This invention relates to new compositons of matter. A narrower aspect of the invention relates to a specific utility for the compositions—their use as catalysts in organic reactions such as reaction of olefinic molucules to make larger molecules. A still more specific part of the invention is the beneficial application of the compostions as catalysts for the cyclooligomerization of monomers such as conjugated open-chain diolefins to obtain cyclo-olefins such as cyclooctadiene and cyclododecatriene.

In the prior art, nickel carbonyl derivatives of amines, of organic and inorganic phosphines and phosphites, of organic arsines and arsenites, and of organic stibines have long been known. Also known are catalysts such as nickel carbonyl per se, nickel chloride, nickel cyanide, nickel acetate, and finely divided nickel metal, with or without an "activator." Some of these have been tried as catalysts for cyclooligomerizations, but published results indicate that even within the periodic group V–A, the nitrogen subgroup, results are not predictable. Thus, in the preparation of cyclooctadiene from butadiene, results published by Reed, Journal of the Chemical Society (London), pages 1931–1941 (1954), show that using other carbonyls than nickel, such as of cobalt or iron, or using group V–A derivatives other than phosphines or phosphites, such as the amines pyridine and o-phenanthroline, led to unsatisfactory results.

Very few successful methods of preparing cyclopolyolefins from open-chain conjugated diolefins have been found. Other methods of preparing similar cyclopolyolefins have been proposed, including thermal dimerization of butadiene, which gives large yields of a by-product, 1,4-vinylcyclohexene (not a cyclopolyolefin within the scope of the meaning used here) and small yields of cyclooctadiene, and catalytic oligomerization, including dimerization, trimerization, and tetramerization of butadiene to cyclooctadiene, cyclododecatriene, and cyclohexadecatetraene using catalysts such as a complex of diethylaluminum chloride with titanium tetrachloride or with a chromium halide, or a complex of aluminum triethyl with a chromium chloride. The preferred or optimum temperatures for such known processes are extremely variable, being 40° C. in one case, between about 100° C. and 120° C. in another case, and 316° C. to 593° C. in yet another instance. The sparsity of useful processes for obtaining cyclopolyolefins from open-chain conjugated diolefins is evident.

Accordingly, the present invention provides new compositions of matter useful for catalyzing organic reactions, and a method of preparing said compositions.

The invention also provides a catalyst and process of making it, said catalyst being the interaction product of nickel carbonyl and certain nontransition element compounds, including organometallic, organometallic hydride, metal hydride, and organometallic halide derivatives of certain nontransition elements.

This invention further provides a process of using certain of the compositions of matter of the invention comprising the steps of using the compositions under conditions which lead to catalysis of the reaction of conjugated open-chain diolefins to yield cyclopolyolefins.

The compositions of matter are in part prepared by interacting a coordination compound of nickel in the zero-valent state, nickel carbonyl, with a compound of certain nontransition metals selected from the group of compounds consisting of the metal hydrides, organometallics, organometallic hydrides, and organometallic halides, suitably at room temperature and suitably in the presence of a solvent which does not inhibit said interaction. The nontransition metal is selected from the metals of periodic groups I–A, II–A, II–B, III–A, and IV–A. Preferred are the group A metals and particularly group III–A. Another aspect of the invention is in aging the interaction product to enhance its utility for certain catalytic reactions, while diminishing its utility for competing reactions. Cyclopolyolefins are prepared by subjecting conjugated open-chain diolefins to an elevated temperature in the presence of a catalyst of the invention, preferably after aging of said catalyst.

The nontransition metal useful according to the invention is a metal of periodic groups I–A, II–A, II–B, III–A, and IV–A, and is selected from the generally preferred group consisting of B, Al, Ga, In, Tl, Li, Na, K, Rb, Cs, Be, Mg, Ca, Sr, Ba, Zn, Cd, Hg, Ge, Sn, and Pb. These elements have an atomic weight no higher than about 208, and have a maximum valence state of +4. Specifically group III–A is preferred, and particularly aluminum.

The nontransition metals as defined above include boron for the purposes of this invention and as used in the description and claims herein. Thus, the invention comprises the interaction products of nickel carbonyl and boron hydrides, organoboron hydrides, organoboron halides, and organoboron compounds, and their use as a catalyst.

As used herein, group I–A is exclusive of francium, which, although theoretically useful, is known only as an artifically obtained radioactive element. Thus, the preferred nontransition metals recited above consist of the stable, naturally occurring isotopes. In this specification, the periodic chart or table of the elements appearing in Fundamental Chemistry, 2nd Edition, by H. G. Deming, John Wiley and Sons, is the one referred to. This table is reprinted in Lange's Handbook of Chemistry, 7th Ed., Handbook Publisher's Inc., Sandusky, Ohio, 1949, at pages 58 and 59. This is the "long" or "Bohr" table.

The nickel compound is nickel carbonyl which is a coordination compound of this transition metal in the zero-valent state. In describing the nickel as zero-valent, the meaning intended is that the carbonyl substituents held by coordination bonds are replaceable by neutral molecules, and that only coordination bonds are present.

The nontransition metal (also sometimes called representative element or metal) compound catalyst components have the generic formula $[(R)_aM(X)_b]_c$, wherein M is a nontransition metal defined above, R is a hydrocarbon or hydrogen radical, X is a halide radical, and $a$ and $b$ are numbers the sum of which is equal to the valence of the metal, with the proviso that $a$ and $c$ are always 1 or more. Where $a$ is more than one and $b$ equals zero, R may include hydrocarbon and hydrogen radicals, as in the organometallic hydrides. When R is exclusively hydrogen, $b$ equals zero. For some catalytic reactions, certain of the compounds embraced by this formula are preferred, as will be discussed below in connection with one of the types of organic reactions catalyzed. Different hydrocarbon and different halogen radicals may be attached to boron or to the same metal atom.

Examples of compounds in which R is exclusively a hydrocarbon radical are: triethyl aluminum, tributyl aluminum, triisobutyl aluminum, diethyl isobutyl aluminum, trihexyl aluminum, tridodecyl aluminum, triphenyl aluminum, ethyl dibenzyl aluminum, triheptyl aluminum, and tricyclohexyl aluminum. Other examples of suitable radicals R include methyl, amyl, propyl, isopropyl octyl, tolyl, vinyl, and allyl. Preferably the organo or hydrocarbon radical is a straight or branched chain alkyl radical, although as indicated above it may be alkylene, cycloalkyl, arylalkyl, or alkylaryl. The radicals R may be similar for the compounds which also have hydrogen or halogen radicals attached to the metal atom, the organometallic hydrides and the organometallic halides. Similar organo compounds of the elements other than aluminum are useful, examples being ethyl lithium, allyl sodium, phenyl sodium, butyl potassium, diethyl calcium, dibutyl zinc, and tetraethyl lead, and similar boron compounds. As used herein, "organometallic" is intended to denote a compound in which the metal is bonded to carbon.

The hydrides useful according to this invention include the following representative examples: $LiH$, $NaH$, $KH$, $RbH$, $CaH$, $BeH_2$, $MgH_2$, $CaH_2$, $SrH_2$, $BaH_2$, $ZnH_2$, $CdH_2$, $HgH$, $HgH_2$, $B_2H_6$, $AlH_3$, $GaH_2$, $GaH_3$, $InH_3$, $TlH$, $TlH_3$, $GeH_2$, $GeH_4$, $SnH_2$, $SnH_4$, $PbH_2$, $PbH_4$, and mixed hydrides of the above such as $LiAlH_4$. Examples of useful organometallic hydrides are: $C_2H_5MgH$, $CH_3CaH$, $(C_2H_5)_2AlH$, $CH_3AlH_2$, and similar compounds wherein R is defined as above.

Organometallic halides within the above formula $$(R)_aM(X)_b$$

include the following examples: $CH_3BeCl$, $C_6H_5MgBr$, $(C_2H_5)_2AlCl$, $C_2H_5AlCl_2$, $C_2H_5PbCl$, $(C_2H_5)_3PbCl$, $C_2H_5PbCl_3$, and similar compounds utilizing the hydrocarbon substituents and nontransition metals suggested above. Useful halogens include chlorine, bromine, fluorine, and iodine. As indicated elsewhere herein, the organometallic halides are not preferred where the reaction to be catalyzed is the preparation of cyclopolyolefins such as cyclooctadiene; thus although useful for catalyzing other reactions, the combination of, for instance, ethyl aluminum dichloride and nickel carbonyl is not effective for preparing cyclooctadiene from butadiene.

In preparing the catalyst, the procedure is critical in certain respects, depending in part upon the intended utility of the catalyst. For some uses it may be preferred to conduct the reaction with freshly prepared catalysts. In accordance with one aspect of the present invention, however, for initiating the reaction of conjugated open-chain diolefins to obtain certain cycloolefins containing at least eight carbon atoms in the ring and at least two carbon-to-carbon double bonds in the ring, it is preferred to prepare the catalyst in such a manner that it is aged before it is used. This is not to say that freshly prepared catalysts may not be used with success, but the aged catalysts generally give better selectivities for certain cyclopolyolefins while minimizing selectivities for other products.

The chemical identity of the compounds or materials existing in the catalyst are not known. Apparently a complex mixture of materials is obtained. For instance, triethyl aluminum mixed at room temperature with nickel carbonyl and a solvent, the mole ratio of aluminum to nickel being 1:1, first gives a colorless solution which becomes yellow, and finally a brown to black precipitate, almost colloidal in appearance, is obtained. With this mixture a brownish color develops first, and a week or so may lapse before a darker and stable color develops, at room temperature. In making cyclooctadiene, for example, from butadiene using this catalyst, the catalyst one hour old and light brown in color gave a somewhat lower selectivity for cyclooctadiene than did the same catalyst one week old and black in color. The selectivity was higher, relatively, for products boiling at a temperature higher than the boiling point of cyclooctadiene, where fresh catalyst was used. Although the older catalyst seems to give an increase in selectivity for certain by-products such as vinylcyclohexane, there is less polymer. Accordingly, in the preparation of cyclooctadiene, it may be preferred to use a catalyst which is aged until a dark-colored mixture is formed, although the colorless solution may be used immediately if desired.

The procedure of preparing the catalyst includes mixing the components thereof, preferably in a solvent, reacting them, and in some cases, before utilizing reaction products thereof as catalysts, aging the mixture. The temperature used for reacting the catalyst components is not particularly critical. For instance, room temperature, about 20° C., is suitable, although other temperatures such as between about 0° C. and 60° C. are useful. Where the reaction is especially vigorous, the lower temperatures should be used, such as between about 0° C. and 30° C. Solvents are preferably used, and are essential with certain nontransition element compounds. Thus, with aluminum triethyl, the reaction with nickel carbonyl is so vigorous as to make the use of a solvent a practical necessity. The more freely hydrocarbon soluble nontransition metal compounds are preferred. Germanium hydride is a gas, and it may be bubbled into the solvent before, during, or after introducing nickel carbonyl. Liquid saturated hydrocarbons, both open-chain and cyclic, are useful as diluents or solvents, as are aromatic hydrocarbons. They may be substituted or unsubstituted. Examples are petroleum naphthas, hexane, heptane, octane, isooctane, cyclopentane, cyclohexane, cyclooctane, benzene, toluene, xylenes, and any solvent or solvent mixture which is substantially inert to the catalyst components, and liquid at the temperature and pressure used to prepare the catalyst. At appropriate temperatures and pressures, butadiene or other open-chain conjugated diolefin may be used as a solvent, since oligomerization does not readily take place at room temperature or lower, for example, and even if a cyclic oligomer such as cyclooctadiene is formed, such materials function as solvents.

The mole ratio of nickel to nontransition metal is suitably between about 1:10 and 10:1.

The catalyst or initiator is preferably used in the form of the reaction mixture, as a solution or suspension. However, it is possible to isolate active components, by means such as evaporating solvent, and such procedure is within the purview of the invention.

An example of a useful procedure for preparing the catalyst includes the steps of dissolving nickel carbonyl in the solvent, then introducing the selected nontransition metal compound, and reacting the mixture at an elevated temperature, including room temperature, preferably 0° C. to 100° C. The mixture is then preferably aged at low or high temperatures (0° C. to 100° C.), until a dark color develops, prior to use as a catalyst. If a high temperature is used for aging, it should not be prolonged. "Poisons" for the catalyst or its components, such as water and air, are excluded insofar as is practicable, although minute amounts are not apparently detrimental as a practical matter. Care must be used in preparing the catalysts, since certain components thereof such as nickel carbonyl are volatile and toxic, and others such as triethyl aluminum are pyrophoric.

Oligomerization of conjugated open-chain diolefins to obtain the cyclopolyolefins of the invention is discussed below. "Cyclooligomers" of conjugated open-chain diolefins or "cyclopolyolefins" as used herein means cycloaliphatic olefinic hydrocarbons having at least eight carbon atoms in the ring and at least two carbon-to-carbon double bonds in the ring. "Diolefin" where used refers to an open-chain conjugated diolefin. The diolefin is reacted with or without added solvent in the presence of the catalyst at an elevated temperature. Suitable temperatures are between about 50° C. and 250° C., but preferably are kept between about 100° C. and 200° C. Pressure normally is autogenous. It may, however, be from about 1.4 to about 70 kilograms per square centimetre absolute.

The quantity of catalyst or initiator used for the oligomerization reactions of the invention is preferably between about 0.5% and 5%, based on the weight of conjugated open-chain diolefin, although useful quantities are between 0.1% and 10%. Excessive amounts of catalyst are not proportionately beneficial. Although the exact nature of the catalyst is not known and it is not ordinarily isolated before use thereof, the amounts specified are determined on the basis of the weights of catalyst constituents used in preparing the catalyst.

The use of the preferred diolefin, 1,3-butadiene, has been mentioned heretofore. Other open-chain conjugated diolefins are of similar utility, including 2-chloro-1,3-butadiene (chloroprene); 2-methyl-1,3-butadiene (isoprene); 1,3-pentadiene (piperylene); phenyldiolefins; 2,3-dimethyl-1,3-butadiene; and 2,4-hexadiene.

Polymerization inhibitors may be used but are not necessary; for instance, such materials are commonly present in butadiene. Common polymerization inhibitors are phenolic compounds such as catechols, quinones, and amino compounds, and such materials may be present in an amount between about .01% and 5% by weight of the diolefin. In addition to inhibitors in ordinary "plant" butadiene of about 98.5% purity, as to hydrocarbon content, other materials are also normally present in amounts ranging from about 0.001% to about 1.0% by weight of the total material. Commonly present are isobutylene, trans-butene-2, cis-tubene-2, propylene propadiene, 1,2-butadiene, acetylenes, carbonyl compounds, and water. Propadiene (up to about 1%) and 1,2-butadiene (up to about 0.2%) are normally the only impurities, exclusive of added ingredients such as polymerization inhibitors, which are present in amounts of about 0.1% or more by weight. The amounts of carbonyl compounds such as aldehydes are normally less than one hundred parts per million, and water is usually present in amounts lower than a few hundred parts per million. Of course, especially pure conjugated diolefin may be used; for example, butadiene with less than about ten parts per million of acetylenes, propadiene, or 1,2-butadiene has been used with good results.

Large amounts of certain impurities are to be avoided. Thus excessive amounts of water may be removed with conventional dehydrating agents such as calcium oxide, calcium carbide, or calcium sulfate. Alternatively, moisture may be frozen and removed; thus water is readily removed from butadiene at −80° C. If desired, peroxide may be removed by treating the diolefin with ferrous salts, thiosulfates, sulfites, or other known methods. Conventional batch or continuous apparatus for conducting the cyclooligomerization may be used. Similarly, known methods of recovering the products and unreacted materials are utilized.

The cyclopolyolefin products of the invention, as is known, are useful as solvents, as monomers in polymerization reactions, and for the preparation of related known compounds having utilities in themselves. An example is hydrogenation to cyclooctane, for instance. Other known uses may be made of the cyclic products.

Representative ways of carrying out the various aspects of the invention are set forth in the following examples.

Example 1

One form of the catalyst, using nickel carbonyl and triethyl aluminum, was prepared as follows: In an atmosphere of dry argon, free of air and moisture, 50 ml. of olefin-free cyclohexane was used to dissolve 4.4 ml. (5.8 g.) of nickel tetracarbonyl. While stirring the mixture, 5.3 ml. (4.5 g.) of triethyl aluminum was slowly added. The temperature was about 20° C., room temperature. This mixture turned light brown within about fifteen minutes after the addition of the triethyl aluminum and when aged for one week it was black in color, apparently being a precipitate having an appearance of colloidal fineness. The mole ratio of Al:Ni was 1:1. The material when one hour old and brown in color was used as catalyst 1a in Example 5, and samples of the catalyst when one week old were used as catalysts 1b and 1c in Example 5.

An additional sample of this catalyst was prepared and a portion was used one hour after the components were mixed, at which time it was a transparent solution. Another portion was used after three hours when it was dark brown in color. The mole ratio of Al:Ni was about 4:1. These were used in Example 5 as catalysts 1d and 1e.

Example 2

A catalyst similar to that of Example 1, using the mole ratio of triethyl aluminum to nickel carbonyl of 1:2 and under similar conditions, except a nitrogen atmosphere was used, and the solvent was "Skellysolve B" (a mixture of liquid hydrocarbons including hexane, heptane, and octane). This catalyst gradually developed a brown color, which became darker with the passage of time. Room temperature was used, and a slight heat of reaction was evident, although no visible evolution of gas occurred. This catalyst was divided and used as numbers 2a and 2b, in suspension.

Similar catalysts were prepared according to the conditions of this example, but in place of triethyl aluminum, the nontransition metal compounds included allyl sodium, ethyl lithium, and alfin catalyst (allyl sodium, sodium isopropoxide, and sodium chloride). The mole ratios of each of these to nickel carbonyl was as set forth in Table I. In each case the solvent was diethyl ether, which was evaporated under vacuum. The solid products were stored under argon until used.

Example 3

Another catalyst was prepared using the manipulative procedure as in Example 1 and room temperature, but using benzene as solvent and triisobutyl aluminum, in a mole ratio of Al:Ni of 1:1. This catalyst, 30 minutes after the components were mixed, gave a brown-colored material.

Example 4

Using the same procedure as Example 3 but using a mole ratio of triisobutyl aluminum to nickel carbonyl of 4:1, gave a catalyst in the benzene solvent, which was black in color after aging for one day.

Similar catalysts may be prepared using boron compounds or nontransition metal compounds of the invention as defined above. The following table summarizes the above catalysts.

TABLE I.—CATALYSTS FROM Ni(CO)₄ AND CERTAIN NONTRANSITION METAL COMPOUNDS

| Catalyst number | Non-transition metal compound | Approx. mole ratio M:Ni | Character of catalyst [1] |
|---|---|---|---|
| 1a | Triethyl aluminum | 1:1 | Brown; 1 hour old. |
| 1b | do | 1:1 | Black; 1 week old. |
| 1c | do | 1:1 | Do. |
| 1d | do | 4:1 | Transparent; 1 hour. |
| 1e | do | 4:1 | |
| 2a | do | 1:2 | Brown 1 hour old. |
| 2b | do | 1:2 | Do. |
| 2c | Ethyl lithium | 1.1:1 | Black. |
| 2d | Allyl sodium | 1.4:1 | |
| 2e | Alfin | (²) | |
| 3 | Triisobutyl aluminum | 1:1 | Brown; 30 minutes. |
| 4 | do | 4:1 | Black; 1 day. |

[1] Times given are taken from the time of complete mixing of the catalyst components.
² 1.7 g. Ni(Co)₄, 1 g. alfin.

Example 5

The catalysts of the foregoing table and examples were utilized in the preparation of 1,5-cyclooctadiene and 1,5,9-cyclododecatriene by a procedure which includes introducing the required amount of catalyst, usually in the solvent in which it was prepared, into a 42 ml. Parr bomb, then introducing the appropriate quantity of open-chain diolefin. A convenient amount was between 10 and 20 grams, using butadiene, for a 42 ml. reactor. After sealing the bombs, they were immersed in a liquid bath heated to the selected temperature, which was maintained during the period of time allowed after which the liquid products of reaction were isolated and analyzed by means of gas chromatography. The conditions and results of the runs of this example are:

amounts of water and apparently a substantial proportion of the polymerization inhibitors such as para-tertiary butyl catechol. Anaylses of butadiene, typical of the butadiene which was used in these examples, and the acetylene components thereof, are as follows:

| Component: | Proportion by weight percent |
|---|---|
| Butadiene-1,3 | 98.36 |
| Isobutane | 0.00 |
| n-Butane | 0.00 |
| Isobutylene | 0.025 |
| Trans-butene-2 | 0.065 |
| Cis-butene-2 | 0.065 |
| Propylene | 0.58 |
| Propadiene | 0.075 |
| Butadiene-1,2 | 0.10 |
| Acetylenes (including methylacetylene, ethylacetylene, vinylacetylene, and dimethylacetylene) | 0.06 |
| Carbonyl | 0.002 |
| Water | 0.02 |

The acetylenic constituents of a similar butadiene sample were analyzed by gas chromatography, and the following compounds and amounts were found:

| Component: | Mole percent |
|---|---|
| Methylacetylene | 0.02 |
| Ethylacetylene | 0.04 |
| Dimethylacetylene | 0.01 |
| Vinylacetylene | 0.002 |

As can be seen, the diolefin as used in the examples contained unsaturated hydrocarbons having 3–4 carbon atoms.

TABLE II

| Catalyst number (see Table I) | Percent of catalyst Based on monomer weight | Time, min. | Temp.,[1] °C. | Conversion, Percent by wt. | Wt. analysis, percent | | | |
|---|---|---|---|---|---|---|---|---|
| | | | | | VCH | COD | HEM (Including CDT) | CDT [3] |
| 1a | 5.1 | 90 | 133 | 91 | 26.5 | 15 | 58.5 | |
| 1b | 3.5 | 55 | 150 | 47 | 59 | 41 | (²) | |
| 1c | 3.5 | 20 | 162 | 52 | 60 | 40 | (²) | |
| 1d | 6.0 | 11 | 170 | 80 | 29 | 36 | 33 | |
| 1e | 7.7 | 20 | 154 | 90 | 24 | 34 | 41 | |
| 2a | 6.0 | 60 | 165 | 91 | 32 | 61 | 7 | 3 |
| 2b | 6.0 | 180 | 165 | 26 | 66 | 18 | 16 | 7 |
| 2c | 2.5 | 180 | 165 | 62 | 57 | 21 | 22 | 3 |
| 2d | 2.5 | 180 | 165 | 42 | 83 | 4 | 13 | 3 |
| 2e | 2.5 | 180 | 165 | 36 | 83 | 4 | 13 | 4 |
| 3 | 5.0 | 20 | 160 | 70 | 40 | 31 | 29 | |
| 4 | 5.0 | 20 | 154 | 63 | 67 | 33 | Trace | |

[1] This was the temperature of the bath; the exothermic nature of the reaction undoubtedly caused higher temperatures.
² Analytical difficulty; probably few percent HEM.
[3] May include small amounts of other volatile materials. Some of the expressions and abbreviations used above are defined as follows:
VCH is 1,4 vinylcyclohexene; COD is 1,5-cyclooctadiene; HEM is material boiling at a temperature higher than the boiling of cyclooctadiene, and includes cyclododecatriene; CDT is 1,5,9-cyclododecatriene.

$$\text{Conversion} = \frac{\text{wt. butadiene consumed}}{\text{wt. butadiene fed total}} \times 100$$

$$\text{Analysis} = \text{selectivity} = \frac{\text{wt. specified product}}{\text{wt. butadiene consumed}} \times 100$$

The diolefins useful according to the invention are those produced by conventional processes. For instance, the butadiene used in the above examples was prepared in a commercial plant by the dehydrogenation of butene, followed by purification with cuprous ammonium acetate. A crystalline complex of the cuprous ammonium acetate with butadiene is formed, and the butadiene is released from the complex by the application of heat. As has been known since 1950 and earlier, from commercial butadiene plane operation in this country, this process gives butadiene of about 95% to 99% purity with little variation for a given set of conditions.

The butadiene used in the above examples was ordinary "plant" butadiene not subjected to any particular purification procedures, except in most cases the material was passed through a column of silica gel to remove excessive

I claim:
1. As a new composition of matter, a material comprising interaction products of (1) nickel carbonyl, and (2) a hydride, an organohydride, an organohalide or an organo compound of a nontransition metal selected from the group consisting of a metal of periodic groups I–A, II–A, II–B, III–A or IV–A, having an atomic weight of less than 208 and being incapable of a valence state of more than +4, the molar ratio of (1) to (2) being between about 1 to 10 and 10 to 1.

2. The catalyst of claim 1 contained in a liquid hydrocarbon.

3. The catalyst of claim 1 in which the compound of the nontransition metal is an organometallic compound.

4. As a new composition of matter, a material comprising interaction products of (1) nickel carbonyl and (2) an organometallic compound of a periodic group III–A metal, the molar ratio of (1) to (2) being between about 1 to 10 and 10 to 1.

5. The catalyst of claim 4 wherein the composition is the interaction product of nickel carbonyl and trialkyl aluminum.

6. The composition of claim 5 in which the trialkyl aluminum is triethyl aluminum.

7. The composition of claim 1 wherein the composition comprises the interaction product of nickel carbonyl and a hydride of a nontransition metal of periodic groups I–A, II–A, II–B, III–A, or IV–A.

8. The composition of claim 1 wherein the composition comprises the interaction product of nickel carbonyl and an organohydride consisting of a nontransition metal of periodic groups II–A, III–A.

9. The composition of claim 1, wherein the composition comprises the interaction product of nickel carbonyl and an organohalide of a nontransition metal of periodic groups II–A, III–A, or IV–A.

10. A process of preparing a composition according to claim 1 wherein nickel carbonyl and the compound of a nontransition metal are introduced into a vessel in proportions such that there is about 1 mole of nickel carbonyl relative to between about 0.1 mole and about 10 moles of the compound, and the compound and nickel carbonyl are caused to interact at a temperature of from about 0° C. to about 100° C.

11. A process of preparing a new composition of matter according to claim 6 wherein an inert solvent, nickel carbonyl, and triethyl aluminum are introduced in proportions such that the mole ratio of aluminum to nickel is between a ratio of about 1 to 10 and a ratio of about 10 to 1, into a reaction vessel, and interacting the same in the presence of said solvent, at a temperature of from about 0° C. to about 100° C.

12. The process of claim 11 in which the reaction product is aged until a color develops in said reaction product.

References Cited

UNITED STATES PATENTS

| 2,965,625 | 12/1960 | Anderson et al. | |
| 3,025,283 | 3/1962 | Heck et al. | 252—428 X |
| 3,170,905 | 2/1965 | Ueda et al. | 252—428 X |
| 3,328,443 | 6/1967 | Clark et al. | 252—431 X |

DANIEL E. WYMAN, Primary Examiner

C. F. DEES, Assistant Examiner

U.S. Cl. X.R.

252—429, 430, 431, 432, 442, 443